US008208912B2

(12) United States Patent
Kamii

(10) Patent No.: US 8,208,912 B2
(45) Date of Patent: Jun. 26, 2012

(54) MOBILE TELEPHONE, INFORMING METHOD, AND PROGRAM

(75) Inventor: Toshihiro Kamii, Osaka (JP)

(73) Assignee: Kyocera Corporation, Kyoto (JP)

( * ) Notice: Subject to any disclaimer, the term of this patent is extended or adjusted under 35 U.S.C. 154(b) by 925 days.

(21) Appl. No.: 11/996,012

(22) PCT Filed: Jul. 19, 2006

(86) PCT No.: PCT/JP2006/314248
§ 371 (c)(1),
(2), (4) Date: Jan. 17, 2008

(87) PCT Pub. No.: WO2007/010929
PCT Pub. Date: Jan. 25, 2007

(65) Prior Publication Data
US 2009/0093239 A1 Apr. 9, 2009

(30) Foreign Application Priority Data
Jul. 20, 2005 (JP) ................. 2005-209897

(51) Int. Cl.
*H04M 3/42* (2006.01)
(52) U.S. Cl. ........................................ 455/416
(58) Field of Classification Search .............. 455/416, 455/33.1, 13.1, 518, 519, 414.1, 418, 435.1, 455/438, 455, 520, 403, 412.1, 422.1, 426.1, 455/426.2, 439, 445, 463, 11.1, 550.1, 41.1, 455/41.2, 500, 452.1, 53.1, 47, 456.6, 74, 455/411; 370/280, 352, 244, 401, 381, 270, 370/58.3, 262, 356, 358, 367, 375, 380, 389, 370/395, 378, 310, 312, 319, 320, 323, 335, 370/342, 341, 347, 346, 349, 442; 379/177, 379/221.12, 260, 202; 340/573.4, 539; 709/231
See application file for complete search history.

(56) References Cited

U.S. PATENT DOCUMENTS
5,912,882 A    6/1999   Yafuso et al.
(Continued)

FOREIGN PATENT DOCUMENTS
JP    2000504182 A    4/2000
(Continued)

OTHER PUBLICATIONS
International Search Report of PCT/JP2006/314248, date of mailing Oct. 31, 2006.
Office Action from Japanese Patent Application No. 2007-526028, mailed on Mar. 15, 2011.

*Primary Examiner* — Melody Mehrpour
(74) *Attorney, Agent, or Firm* — Morrison & Foerster LLP

(57) ABSTRACT

A mobile telephone performs communication by transmitting voice, which is inputted by a speaker into a communication apparatus having a floor, via a server, to one or more communication devices of one or more listener(s) having no floor. A transmitter transmits a request signal, which requests an acquisition of a floor, to the server (Step S104) when a predetermined operation is performed by a user (Step S103: YES). A receiver receives both a permission signal, which is transmitted from the server in response to the request signal for permitting the acquisition of a floor, and numerical information, which is transmitted from the server, indicating the number of communication apparatuses of the listener(s) (Step S101 and S106). An informing control subunit performs different informing controls in accordance with the number indicated by the numerical information when the receiver receives the permission signal (Step S107 to S109).

14 Claims, 15 Drawing Sheets

U.S. PATENT DOCUMENTS

| | | | |
|---|---|---|---|
| 7,899,478 B2* | 3/2011 | Fodor | 455/518 |
| 2002/0133611 A1* | 9/2002 | Gorsuch et al. | 709/231 |
| 2003/0228881 A1* | 12/2003 | Yamamoto et al. | 455/550.1 |
| 2004/0110474 A1* | 6/2004 | Yonekura et al. | 455/74 |
| 2005/0113071 A1* | 5/2005 | Nagata | 455/411 |
| 2006/0154674 A1* | 7/2006 | Landschaft et al. | 455/456.6 |
| 2006/0172752 A1* | 8/2006 | Harris et al. | 455/518 |
| 2007/0281725 A1* | 12/2007 | Hyatt | 455/519 |

FOREIGN PATENT DOCUMENTS

| | | |
|---|---|---|
| JP | 2004-320637 | 11/2004 |
| JP | 2006222876 A | 8/2006 |
| WO | 0047005 A1 | 8/2000 |
| WO | WO-03/093950 | 11/2003 |

* cited by examiner

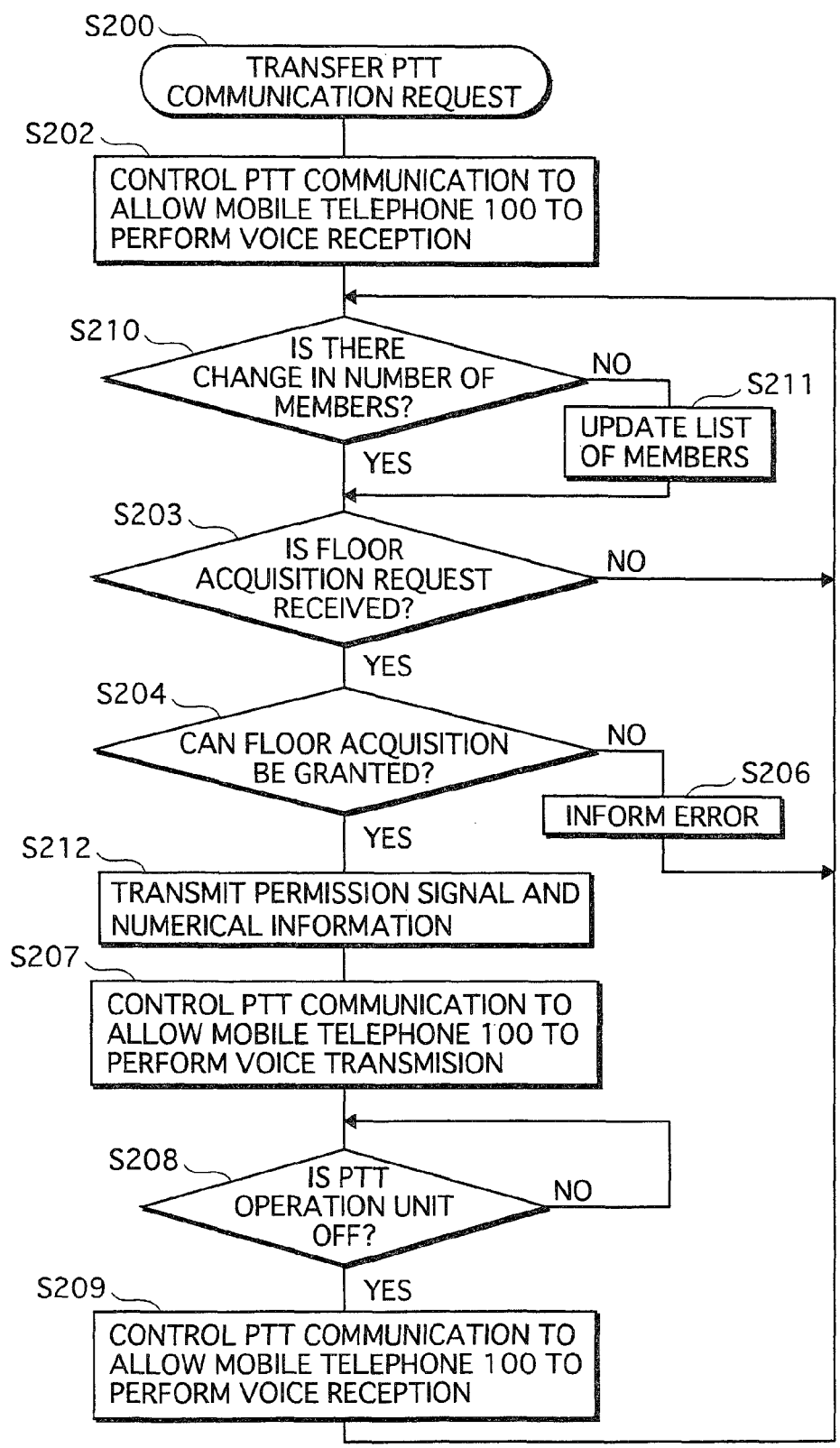

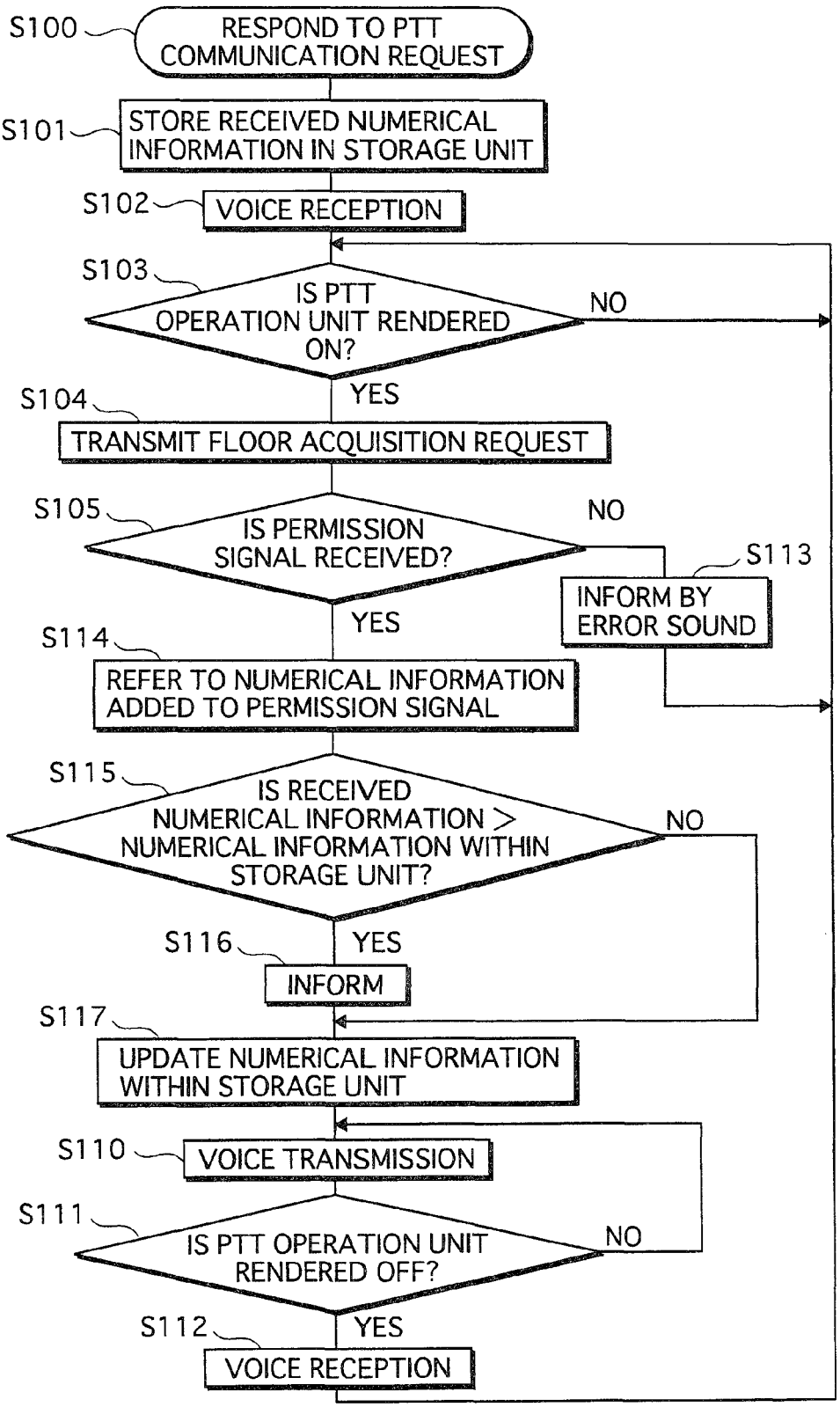

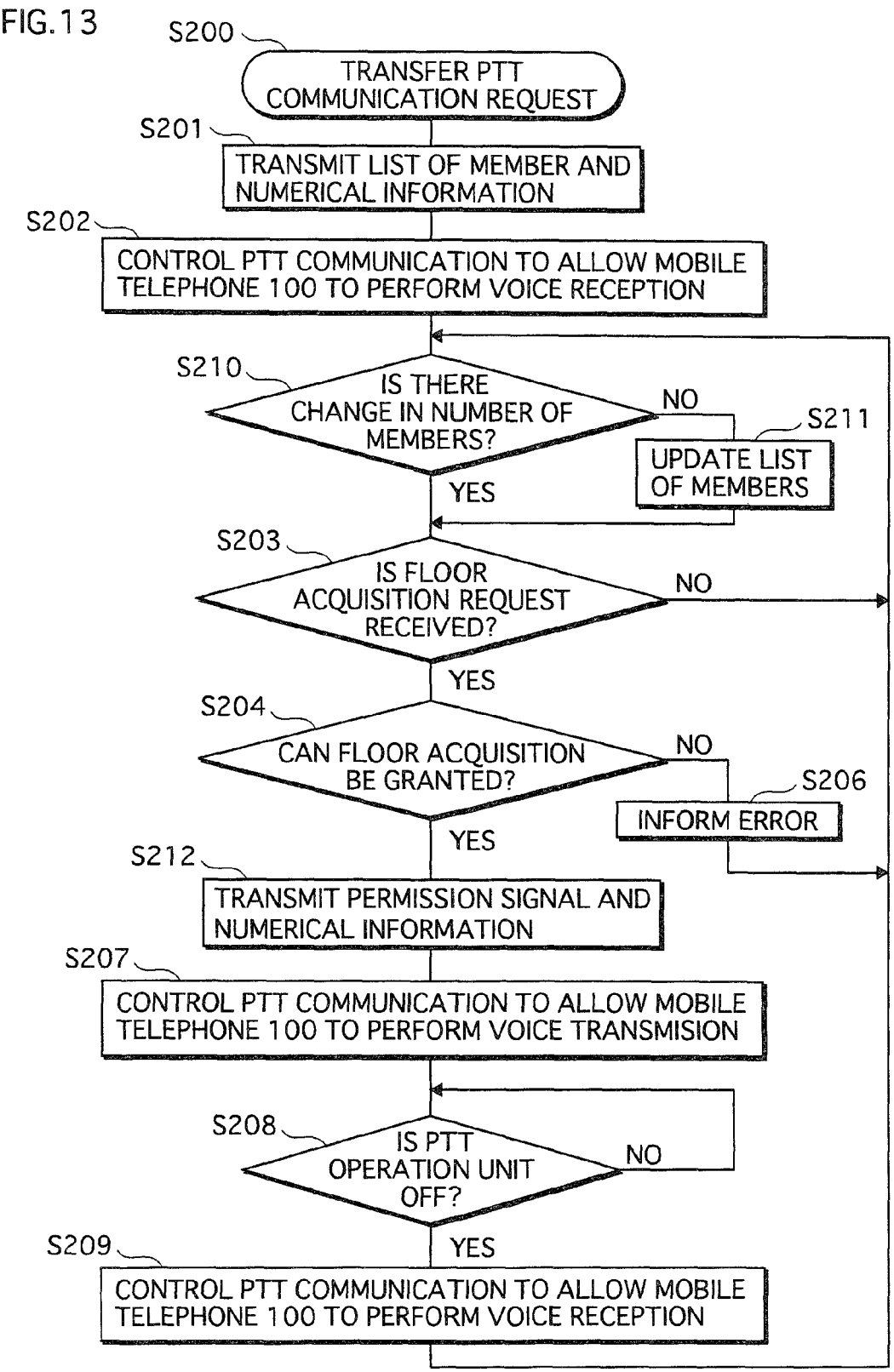

MOBILE TELEPHONE, INFORMING METHOD, AND PROGRAM

TECHNICAL FIELD

The present invention relates to a mobile telephone capable of performing a group communication among a plurality of members.

BACKGROUND ART

Conventionally, a mobile telephone capable of performing a group communication among a plurality of users, forming a group of a plurality of users, is well-known. Particularly in recent years, there is an attempt to perform the group communication by voice, via a packet exchange network, using VoIP (Voice Over Internet Protocol). An example of the group communications is called PTT (Push To Talk). A radio telephone and a PTT system having a PTT function are disclosed in Patent Document 1.

Here, PTT is described briefly in the following.

In the PTT, a server is provided on a network, and the server performs communication control among users, along with managing a group formed by a plurality of users.

To describe specifically, firstly, a user who wants to be a speaker first chooses one or more communication partners, and transmits a communication request to the communication partners via the server. When the communication partners respond to the communication request, the responding communication partners become listeners. Then a group of a speaker and listeners is formed and the group communication begins. When this group communication begins, information indicating whether the number of listeners is one or plural is transmitted from the server to respective mobile telephones of the speaker and the listeners. Along with the transmission of the information, if the respective mobile telephones have display unit such as liquid crystal display (LCD) device and the like, displays as shown in FIGS. 15A and 15B, for example, are displayed thereon. That is, when the number of listeners other than the speaker is one, an icon as shown in FIG. 15A is displayed and when the number of listeners other than the speaker is plural, an iconic display as shown in FIG. 15B is displayed. Thus, when the PPT communication begins, only the speaker having a floor (a right to speak) is permitted to speak. So, if a listener wishes to speak as a speaker, the listener has to make a new request to the server for the acquisition of the floor, after the speaker finishes speaking and releases the floor. When the server having received the request grants permission, the listener acquires the floor and becomes a new speaker, being permitted to speak.

Thus, a plurality of mobile telephones take turns acquiring the floor under the management of the server, which allows alternation or rotation of a speaker and listeners, realizing the group communication.

Note that, in the present description, communication where there is only one listener is called "one-to-one" communication and communication where there are a plurality of listeners is called "one-to-many" communication.

Patent Document 1: Laid-Open Patent Publication No. 2002-536928

DISCLOSURE OF THE INVENTION

Problems to be Solved

However, enabling the one-to-one communication and the one-to-many communication using the above mobile telephone may give rise to some disadvantages to a listener in speaking as a speaker.

That is, during the group communication, the listeners can only listen to the voice of a speaker. Therefore, when the listener becomes a speaker to speak after having listened to the speech made by the previous speaker ("user A", for example), a new speaker may say something that the speaker does not want anyone but the user A to hear (e.g. something very private or gossip about other users), assuming that the user A is the only listener even though there are other listeners other than user A.

This disadvantage may arise especially in the following situation. At first, a new speaker is having the one-to-one communication with the user A. However, during the one-to-one communication, another user ("user B", for example) joins the group and the one-to-one communication changes to the one-to-many communication. However, the present speaker hardly notices the change in the number of listeners while speaking.

Means to Solve Problems

In order to solve the above problem, the mobile telephone pertaining to the present invention comprises a communication performing unit operable to perform communication by transmitting voice, which is inputted by a speaker having a floor, via a server, to one or more communication apparatuses of one or more listeners having no floor; a receiver operable to receive situation information, which is transmitted from the server, indicating a situation of the communication apparatuses of the listeners; and an informing control unit operable to perform informing control to inform in different manners in accordance with the number of the communication apparatuses of the listeners which is indicated by the situation information.

Here, the situation information, for example, is information that enables the user to confirm the situation of the listeners' participation in the communication, such as the list of listeners participating in the communication, numerical data to which the number of listeners and a speaker is shown in numeric terms, and the like.

Here, an example of informing control that informs the user in different manners in accordance with the number of communication apparatuses of listeners is given below. In informing using a speaker, the informing control subunit controls to emit sound in different manners that are recognized to be aurally different sounds from one another by changing tone, changing sound duration and the like.

Also, other than emitting a sound from the speaker, vibration generated by a vibrator, light emitted by an illuminant and the like are possible.

BRIEF DESCRIPTION OF THE DRAWINGS

FIG. 10 is a flowchart of the second embodiment showing the processing operation of the server 400 in performing the PTT communication;

FIG. 12 is a flowchart of the third embodiment of the present invention showing the processing operation of the mobile telephone 100 in performing the PTT communication;

FIG. 13 is a flowchart showing the processing operation of the server 400 in performing the PTT communication;

Figure 1:
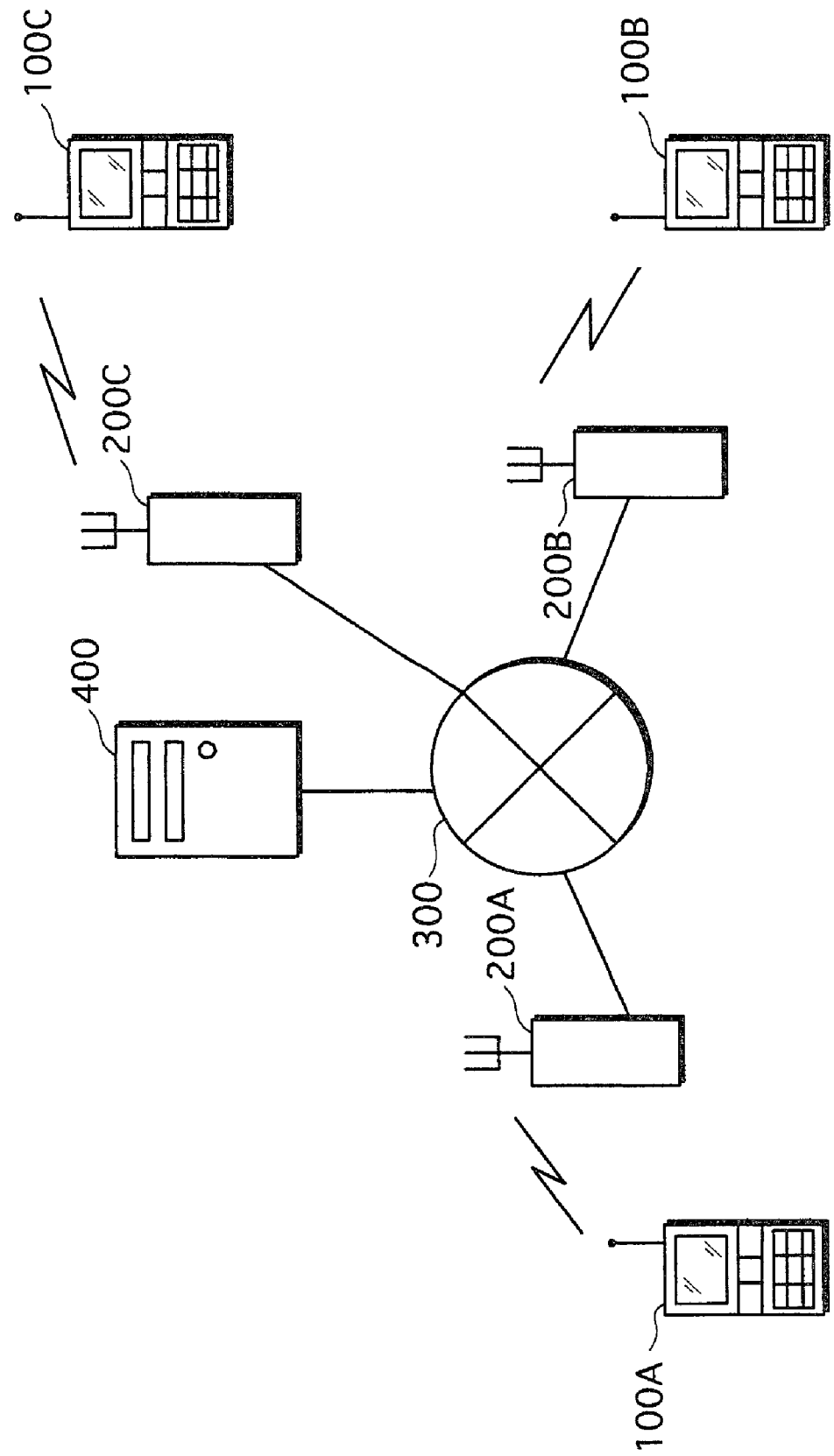
FIG. 1 is a schematic illustration showing a main part of the PTT system that realizes the PTT communication.

DESCRIPTIONS OF REFERENCES 100 mobile telephone
101 first casing
102 second casing
103 connecting member
104 antenna
105 loudspeaker
106 display unit
107 microphone
108 operation unit
109 LED light emission unit
110 PTT operation unit
111 vibrator
112 USB terminal
113 radio communication unit
114 storage unit
115 control unit
200 base station
400 server
700 external device

DESCRIPTION OF THE PREFERRED EMBODIMENT

First Embodiment

Hereinafter, the first embodiment is described, taking PTT communication as an example of the group communication with reference to the accompanying drawings.

<1. System>

Firstly, the PTT system for realizing the PTT communication is described in the following.

FIG. 1 is a schematic illustration showing the main part of the PTT system for realizing the PTT communication.

Mobile telephones 100A to 100C respectively are mobile telephones capable of performing the PTT communication, and respective mobile telephones are connected to a network 300 via base stations 200A to 200C. A server 400 is a server for performing communication control of the PTT communication, and is connected to the network 300, just like the mobile telephones 100A to 100C. Thus, the respective mobile telephones 100A to 100C are connected to the server 400 via the network 300, and the respective mobile telephones are configured to be able to perform the PTT communication with each other via the server 400.

Also, in the present description, the mobile telephones are considered to have the same configuration and the respective mobile telephones 100A to 100C are referred to as a mobile telephone 100. Also, similarly, respective base stations are considered to have the same configuration, and the respective base stations 200A to 200C are referred to as a base station 200.

<2. Structure>

Hereinafter, the configuration of the mobile telephone 100 and the configuration of the server 400 are described.

<2-1. Structure of the Mobile Telephone 100>

Figure 2:
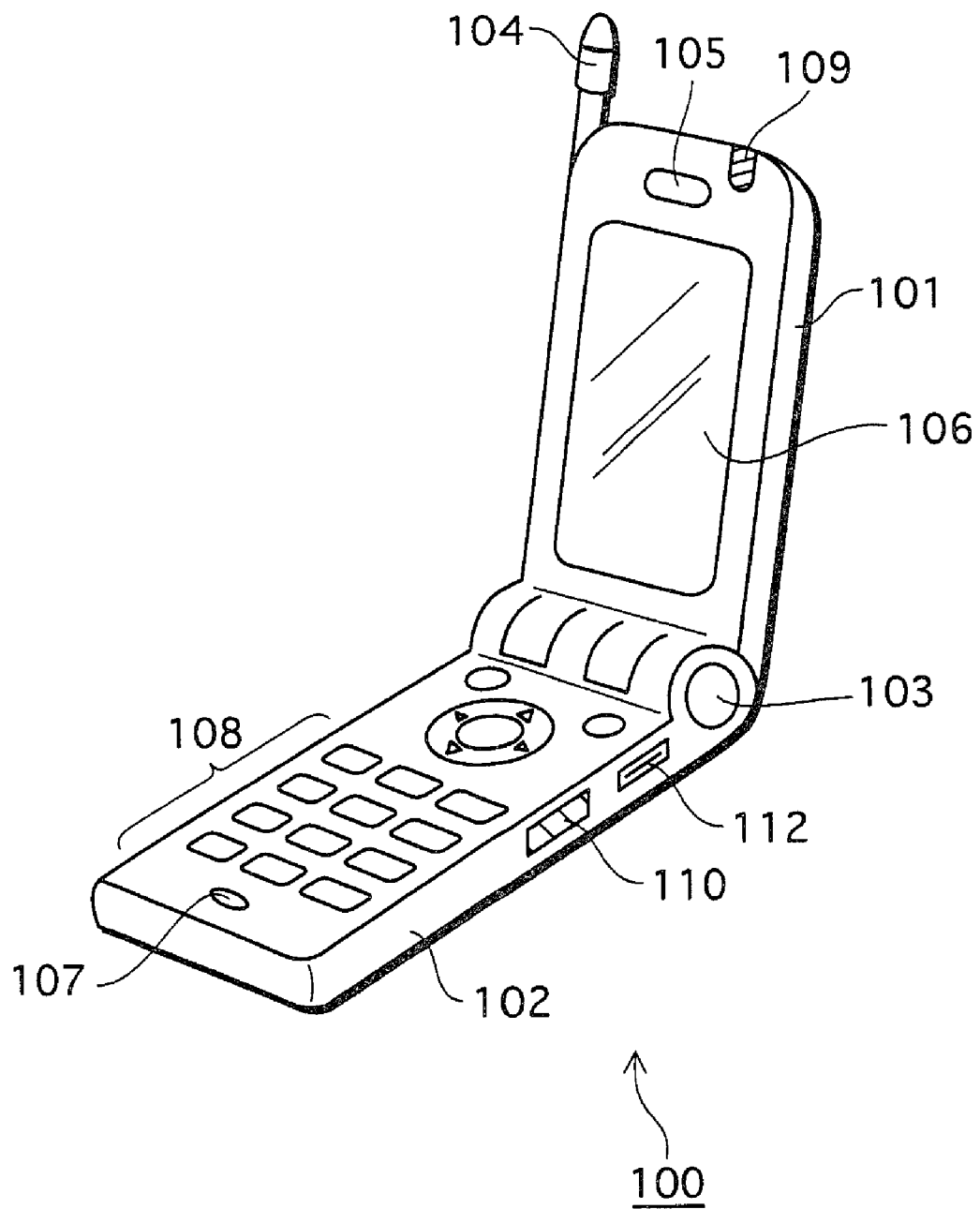
FIG. 2 is a perspective view of an external main part of the mobile telephone 100 pertaining to the present invention.

FIG. 2 is a perspective view showing the external main part of the mobile telephone 100.

Figure 3:
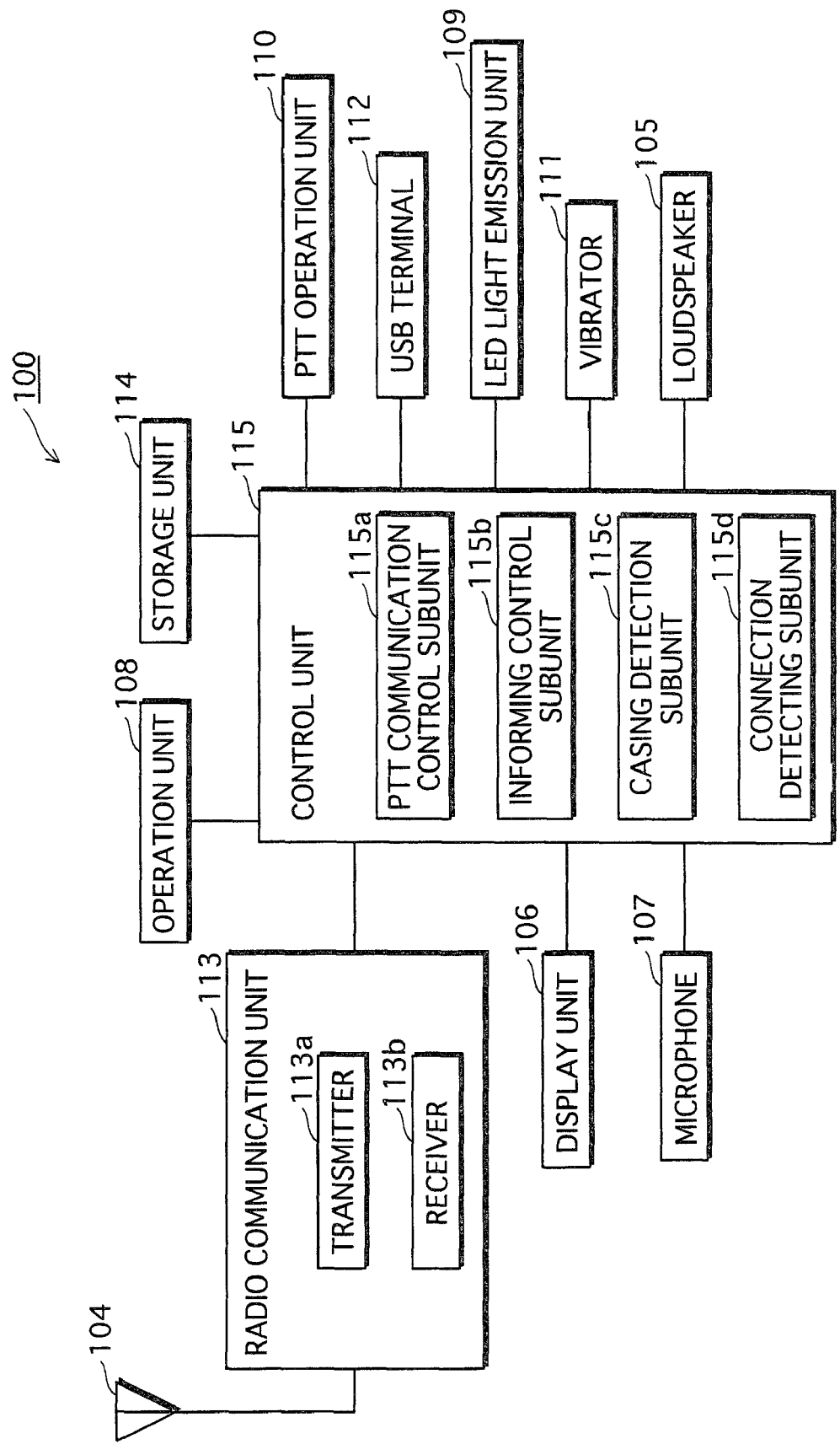
FIG. 3 is a functional block diagram showing a main part of the mobile telephone 100.

FIG. 3 is a functional block diagram showing the main part of the mobile telephone 100.

As shown in FIG. 2, the mobile telephone 100 is, a so-called, a folding mobile telephone that is composed of a first casing 101 and a second casing 102 which are connected foldably onto each other via a connecting member 103.

The first casing 101 includes an antenna 104, a loudspeaker 105, a display unit 106 and an LED light emission unit 109.

The antenna 104 transmits/receives a carrier wave for performing a radio communication.

The loudspeaker 105 emits the sound by converting speech signal to sound. In communicating with other communication apparatuses, for example, the loudspeaker 105 emits a voice given by the communication partner, or sounds a ring tone to inform the user of the mobile telephone 100 of an incoming call.

The LED light emission unit 109 is a light emission unit that has an LED (light emitting diode) as a light emitting element. To inform the user of the mobile telephone 100 of the incoming call, the LED light emission unit, for example, emits light at constant intervals.

The display unit 106 is a display device formed from LCD (liquid crystal display) and the like and displays various information needed for using the mobile telephone 100.

Also, the second casing 102 includes a microphone 107, an operation unit 108, a PTT operation unit 110 and a USB terminal 112.

The microphone 107 collects sound and converts the sound into speech signal. In communicating with other communication apparatuses, for example, the microphone 107 collects the voice given by the user of the mobile telephone 100.

The operation unit 108 is an input apparatus that consists of a set of depressible keys with alphanumeric and Chinese characters printed thereon, and is used by the user for operating the mobile telephone 100.

The PTT operation unit 110 is a depressible key that is operated by the user when the mobile telephone 100 makes a speech to other communication partners as a speaker within the PTT communication.

The USB terminal 112 is an interface that is based on the USB (Universal Serial Bus) standard, and is used to connect the mobile telephone 100 to external devices provided as peripheral equipment of the mobile telephone 100.

Also, as shown in FIG. 3, inside the mobile telephone 100 are provided a radio communication unit 113, a storage unit 114, a vibrator 111 and a control unit 115.

The radio communication unit 113 is the communication unit for the mobile telephone 100 to perform radio communication with the base station 200, and includes a transmitter 113a and a receiver 113b. The transmitter 113a encodes and modulates data to be transmitted and sends the resulting data to the antenna 104. The receiver 113b demodulates and decodes the signal inputted from the antenna 104, and obtains data to be received.

The storage unit 114 is formed from a volatile memory such as RAM (Random Access Memory) or the like, and stores data in accordance with the operation of the user and the processing of all kinds of functions of the mobile telephone 100.

The vibrator 111 is an electric motor with a mass on its driveshaft for generating vibrations, and generates the vibrations, for example, to inform the user of the mobile telephone 100 of the incoming call.

The control unit 115 is connected to respective components 104 to 114 included in the mobile telephone 100 and serves as a CPU (Central Processing Unit) that controls the respective components. Particularly, the control unit 115 includes a PTT communication control subunit 115a, an informing control subunit 115b, a casing detection subunit 115c and a connection detecting subunit 115b.

The PTT communication control subunit 115a performs communication processing for the PTT communication. In particular, the PTT communication control subunit generates a request signal requesting the acquisition of the floor to speak to other communication partners within the PTT communication in accordance with a push of the PTT operation unit 110.

The informing control subunit 115b controls the informing operation using the loudspeaker 105. The casing detection subunit 115c detects whether the first casing 101 and the second casing 102 are folded onto each other.

The connection detecting subunit 115d detects whether the USB terminal 112 is connected to an external device.

<2-2. Structure of the Server 400>

Figure 4:
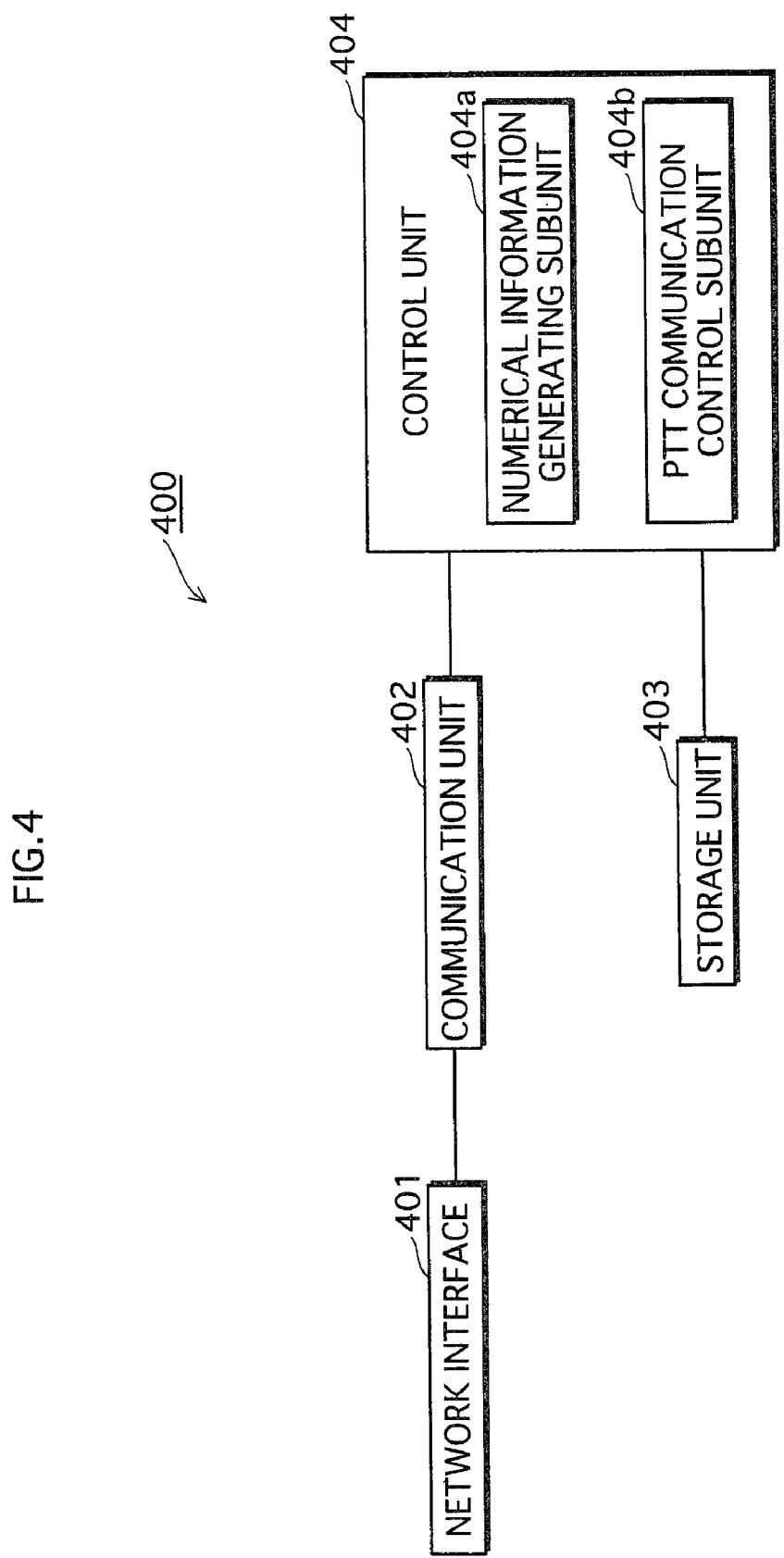
FIG. 4 is a functional block diagram showing a main part of the server 400.

FIG. 4 is a functional block diagram showing the essential of the server 400.

The server 400 is a computer such as PC (Personal Computer) or the like to administrate the PTT communication performed by the mobile telephone 100, and includes a network interface 401, a communication unit 402, a storage unit 403 and a control unit 404.

The network interface 401, for example, is based on Ethernet (registered trademark) standard, and connects the server 400 to the network 300 via a cable.

The communication unit 402 encodes the data to be transmitted and sends the resulting data to the network interface 401. Also, the communication unit 402 decodes signal inputted from the network interface 401 and obtains the data to be received.

The storage unit 403 is formed from a volatile memory such as RAM (Random Access Memory) or the like, and stores data in accordance with the operation of the user or processes of various functions of the server 400. Particularly, a list of members 500 for administrating the mobile telephone 100 that performs the PTT communication is stored in storage unit 403. Here, details of the list of members 500 are described later.

The control unit 404 is a CPU that is connected to the respective components 401 to 403 provided in the server 400 and controls the respective components. The control unit 404, in particular, includes a numerical information generating subunit 404a and a PTT communication control subunit 404b which are realized by a computer program.

The numerical information generating subunit 404a generates numerical information 600 (described later) relating to the number of mobile telephones performing the PTT communication based on the list of members 500 stored in the storage unit 403.

Having received the floor acquisition request which is transmitted from the mobile telephone 100, the PTT communication control subunit 404b judges whether or not to grant the mobile telephone 100 the floor. Then, in the case of granting the floor, the PTT communication unit 404b sends permission signal that informs the communication unit 402 that the permission has been granted.

<3. Data Structure of the List of Members>

The list of members administrated in the storage unit 403 in the server 400 is described in the following.

Figure 5A:
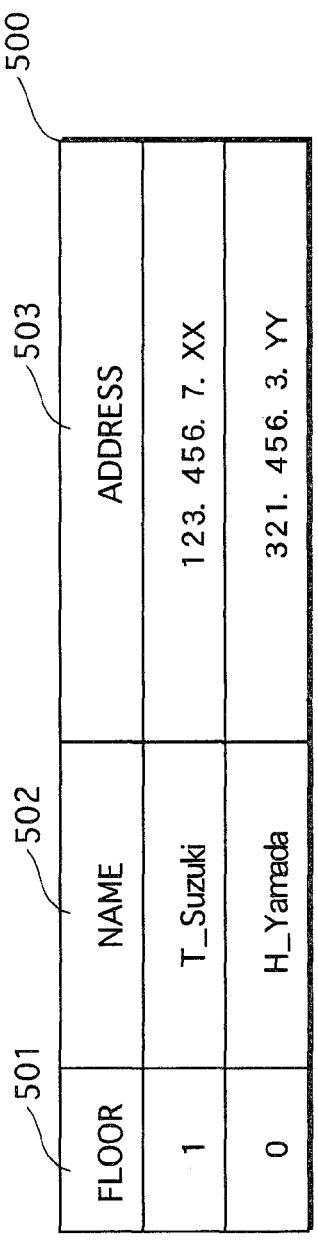
FIGS. 5A and 5B are schematic illustrations showing a data structure of the list of members, which is managed by the storage unit 403 in the server 400.
Figure 5B:
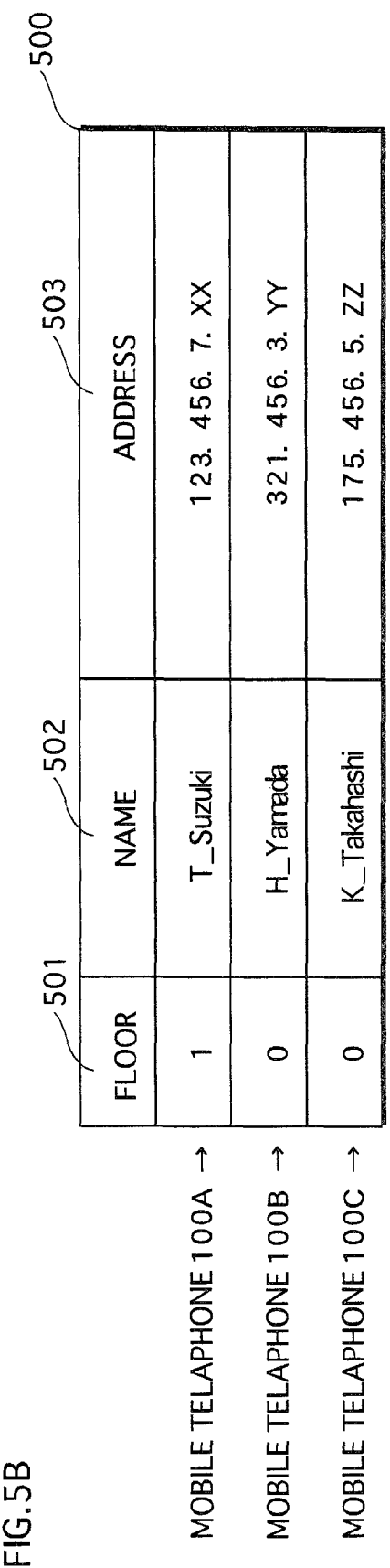

FIGS. 5A and 5B are schematic illustrations showing the data structure of the list of members that the storage unit 403 holds. Note that FIG. 5A illustrates the list of members of the case where two users participate in the group communication, whereas FIG. 5B illustrates the list of members of the case where three users participate in the group communication.

As shown in FIGS. 5A and 5B, the list of members 500 is formed from a table and has items such as a floor 501, a name 502 and an address 503 in respective rows. The name 502 is the name of the users of mobile telephone 100 participating in the PTT communication. The address 503 represents IP (Internet Protocol) address, which is an identifier and is assigned to the mobile telephones 100 that correspond to the users shown by the name 502, on the network. Also, in the floor 501 columns, of the users that the name 502 indicates, the mobile telephone 100 of the user having the floor is shown by "1", and the other mobile telephone (s) having no floor are shown by "0".

Also, in the present description, the users indicated by the name 502 and the mobile telephone 100A to 100C shown in FIG. 1 are described with reference to the following.

(A) Mobile telephone 100A—T_Suzuki
(B) Mobile telephone 100B—H_Yamada
(C) Mobile telephone 100C—K_Takahashi <4. Processing Operation>
<4-1. Processing Operation of the Mobile Telephone 100>

Next, processing operation when the mobile telephone performs the PTT communication via the server 400 is described. Here, a description is given of a case where the mobile telephone 100 performs the PTT communication at first as a listener.

Figure 6:
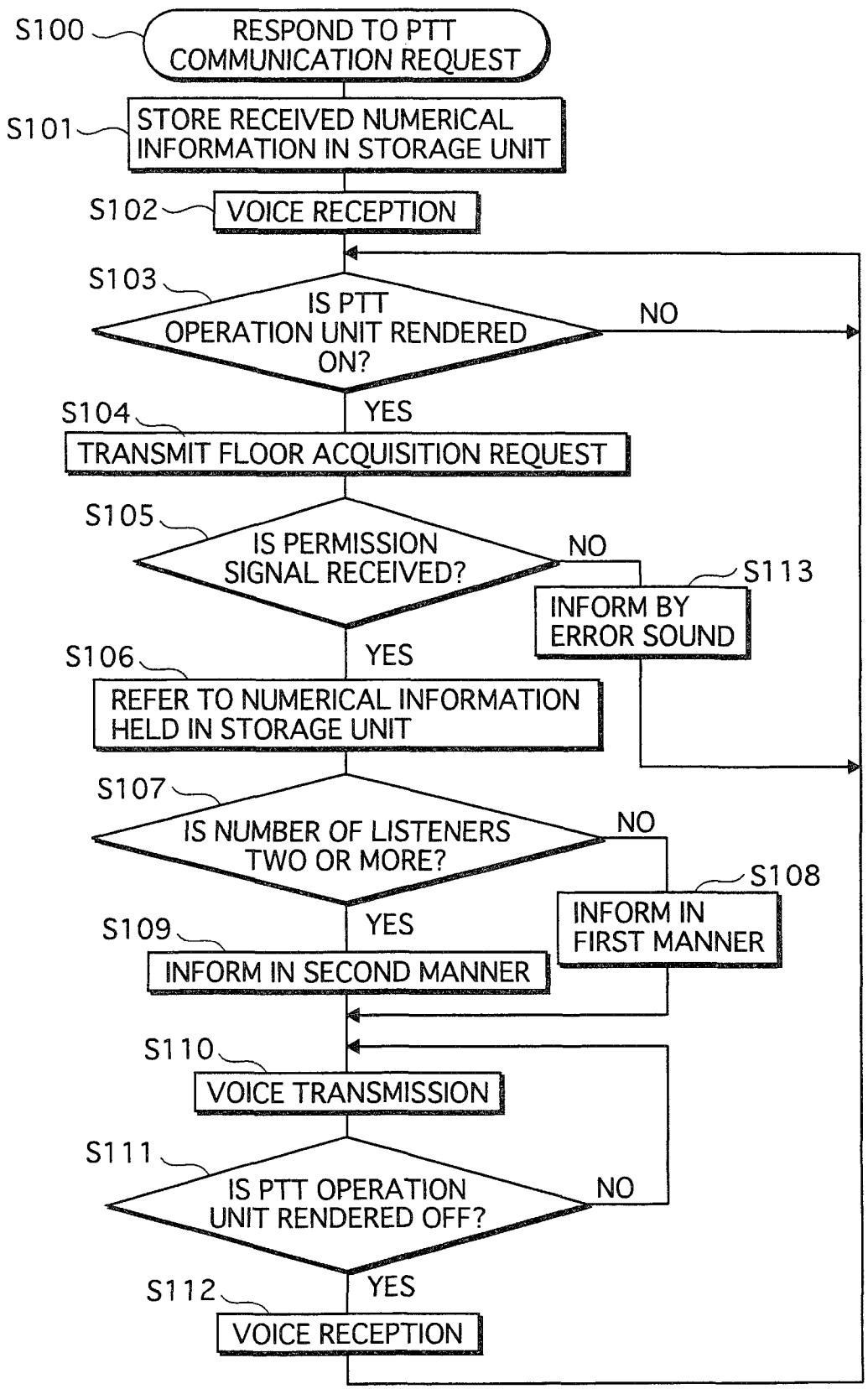
FIG. 6 is a flowchart of the first embodiment showing the processing operation of the mobile telephone 100 in performing the PTT communication.

FIG. 6 is a flowchart of the first embodiment showing the processing operation of the mobile telephone 100 in performing the PTT communication.

Firstly, having received the PTT communication request from the mobile telephone of another user (the initiator of the PTT communication), the mobile telephone 100 responds to this PTT communication request (Step S100).

Next, since the list of members 500 and the numerical information 600 (described later) indicating the number of listeners of members are sent from the server, the mobile telephone 100 stores the list of members and the numerical information 600 in the storage unit 114 (Step S101).

When the PTT communication starts after going through the Steps S100 and S101, the mobile telephone 100 starts a voice reception as a listener (Step S102). During the voice reception, the speech signal transmitted from the mobile telephone 100 of the initiator (the speaker) is received in receiver 113b, and then voice, which is obtained after demodulating the speech signal, is emitted form the loudspeaker 105.

Thus, the PTT communication starts between the mobile telephone 100 and the mobile telephone of the initiator.

After that, when the listener, during the PTT communication, wants to speak as a speaker, the push of the PTT control unit 110 by the user (Step S103: YES) causes the mobile telephone 100 to transmit, to the server, the request for the acquisition of the floor (Step S104). Note that the voice reception continues until the PTT control unit 110 is pushed (Step S103: NO).

If the acquisition of the floor is granted, the mobile telephone 100 receives the permission signal from the server 400 (Step S105: YES). On the other hand, if the acquisition of the floor is not granted (Step S105: NO), a predetermined error sound is emitted from the loudspeaker 105 to inform (Step S113).

Here, having received the permission signal (Step S105: YES) after the acquisition of the floor had been granted, the mobile telephone 100 refers to numerical information 600 stored in the storage unit 114 (Step S106), and judges the number of listeners of the time when the user of the mobile telephone 100 speaks (Step: S107). If the number of listeners is judged to be one (Step S107: NO), the sound is emitted in the first manner from the loudspeaker 105 to inform (Step S108). On the other hand, if the number of listeners is judged to be two or more (Step S107: YES), the sound is emitted in the second manner to inform (Step S109). Here, the manners may be the tone, the sound duration and the like that are recognized to be different sounds aurally or in the sound-emission frequency. For example, the mobile telephone may ring once (e.g. "beep") in the first manner, and twice (e.g. "beep beep") in the second manner. Or, a variety of audio data having different tones from one another may be stored in the storage unit 114 so as to play one sound in the Step S108 and the other sound in S109. Here, the manner includes silence, whereby no sound is emitted. Therefore, one of the first and second manners may be inaudible.

When a notification is performed in either step S108 or step S109, the mobile telephone 100 performs the voice transmission as a speaker (Step S110). During the voice transmission, the audio signal of speech inputted into the microphone 107 by the user is modulated in the transmitter 113*a* and is transmitted to the server 400 via the antenna 104.

Then, unless the user stops the push of the PTT operation unit 110 to render the PTT operation unit off, the mobile telephone 100 continues to perform the voice transmission (Step S111: NO, or Step 208: NO). Meanwhile, when the PTT operation unit 110 is rendered off (Step S111: YES), the mobile telephone 100 returns to the voice reception (Step S112).

<4-2. Processing Operation of the Server 400>

Next, the processing operation that the server 400 performs with the mobile telephone 100 is described in the following.

Figure 7:
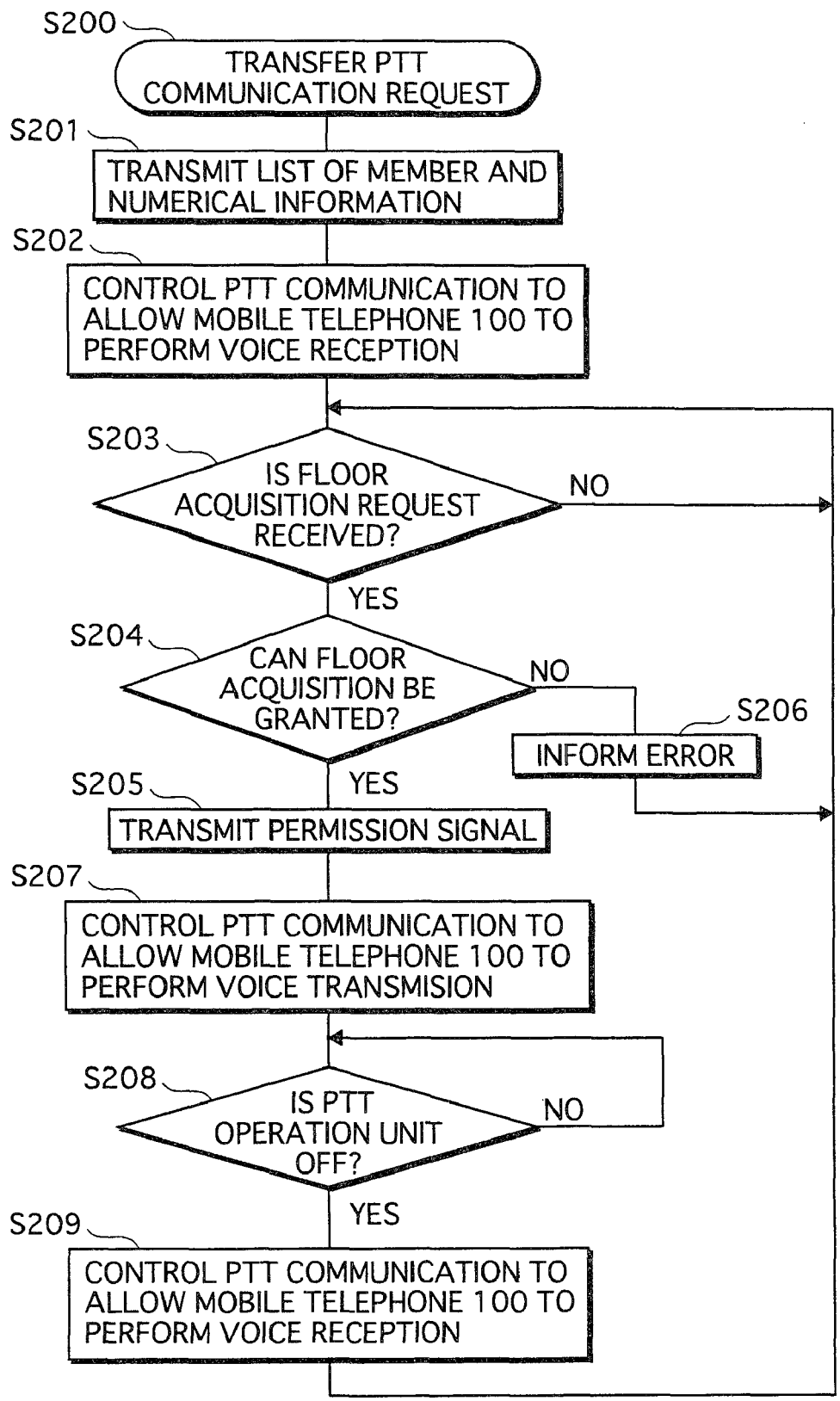
FIG. 7 is a flowchart showing the processing operation of the server 400 in performing the PTT communication.

FIG. 7 is the flowchart of the first embodiment showing the processing operation of the server 400 in performing the PTT communication.

Firstly, having received the PTT communication request to the mobile telephone 100 from the mobile telephone of the user (the initiator of the PTT communication), the server 400 transfers the PTT communication request to the mobile telephone 100 (Step S200).

Next, if the mobile telephone 100 responds to the PTT communication, the members of the PTT communication are determined. Therefore, the server stores the list of members 500 in the storage unit 403 and the numerical information 600 (described later) that indicates the number of listeners based on the list of members 500 is generated in the numerical information generating subunit 404*a*. Then, a data frame including the list of members 500 and the numerical information 600 is transmitted to the mobile telephone 100 (Step S201).

Now, a preparation for performing the PTT communication is ready and the server 400 controls the PTT communication to allow the mobile telephone 100 to perform the voice reception in the PTT communication control subunit 404*b* (Step S202). That is, the audio signal transmitted from the mobile telephone of the initiator (speaker) is transferred to the mobile telephone 100.

Thus, the PTT communication between the mobile telephone 100 and the mobile telephone of the initiator starts.

After that, having received the request for the acquisition of the floor (Step s203: YES), the server 400 judges whether the acquisition of the floor can be granted or not (StepS204) and transmits the permission signal indicating the permission of the acquisition of the floor, to the mobile telephone 100 (Step S205) if the acquisition for the floor can be granted (Step S204: YES).

Note that if the server 400 does not receive the request for the acquisition of the floor from the mobile telephone 100 (Step S203: NO), the control of the PTT communication that has started in Step S202 continues. Also, if the acquisition of the floor cannot not be granted (Step S204: NO), the control of the PTT communication that has started in the Step S202 continues after informing an error to let the mobile telephone 100 know that the acquisition of the floor cannot be granted. Then, the control of the PTT communication that has started in the Step S202 continues.

After transmitting the permission signal to the mobile telephone 100, the server 400 controls the PTT communication to allow the mobile telephone 100 to perform the voice transmission as a speaker (Step 207). That is the server 400 transfers the audio signal transmitted from the mobile telephone 100 to the mobile telephone of the initiator.

From then on, unless the push of the PTT operation unit 110 of the mobile telephone 100 stops and the PTT operation unit 110 is rendered off, the control of the PTT communication that has started in Step S207 continues (Step S208: NO). On the other hand, if the PTT operation unit 110 is rendered off, the server 400 continues the PTT communication control to allow the mobile telephone 100 to perform the voice reception as a listener again in the PTT control subunit 404*b* (Step S209).

<4-3. Specific Example>

Next, descriptions are given, as specific examples of the processing operation of the server 400, of the following two cases. One is a case 1 where the PTT communication starts between T_Suzuki (initiator) and H_Yamada, and the other is a case 2 where the PTT communication starts among T_Suzuki (initiator), H_Yamada and K_Takahashi. Then the processing operation performed by a mobile telephone 100B of H_Yamada and the server 400 in respective cases is described in the following by comparing the case 1 and the case 2.

Figure 8A:
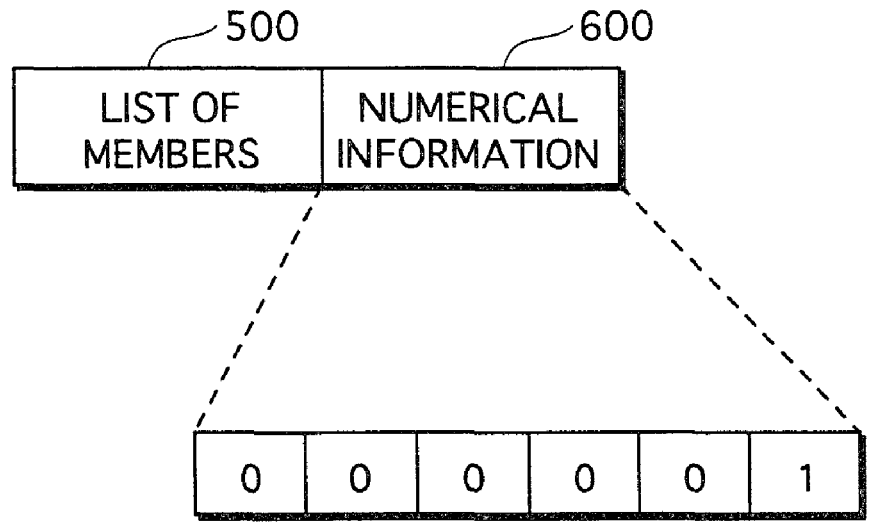
FIGS. 8A and 8B are schematic illustrations showing data frames of data transmitted from the server 400 to the mobile telephone 100.
Figure 8B:
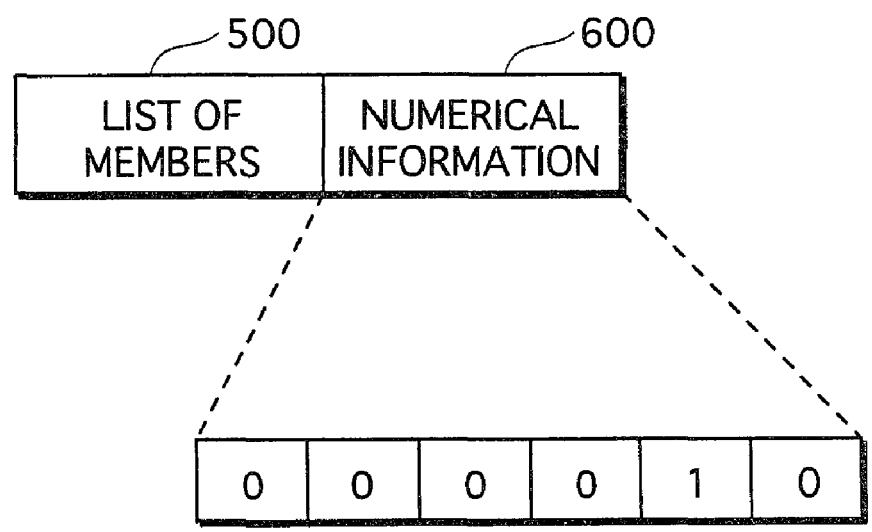

FIGS. 8A and 8B are schematic illustrations showing data frames of data that the server 400 transmits to the mobile telephone 100, in starting the PTT communication.

In the case 1, since T_Suzuki who is the initiator of the PTT communication and H_Yamada are parties in the communication, the server 400 stores the list of members 500 shown in FIG. 5B in the storage unit 403. On the other hand, in the case 2, since T_Suzuki, H_Yamada and K_Takahashi are parties, the server 400 stores the list of members 500 shown in the FIG. 5B in the storage unit 403.

Also, in the case 1, as the total number of members is "2", the number of listeners is "1". Therefore, as shown in FIG. 8A, the server 400 generates numerical information 600 of 6-bit binary "000001" that expresses "1", and the generated numerical information 600 is transmitted to the mobile telephones 100A and 100B with the list of members 500. On the other hand, in the case 2, since the number of listeners is "2", as shown in FIG. 8B, the server 400 generates numerical information 600 of 6-bit binary "000010" that expresses "2", and the generated numerical information is transmitted to the mobile telephones 100A to C with the list of members 500.

After that, as described above, the mobile telephone 100B stores the numerical information 600 in the storage unit 114 (Step S101) and performs the voice reception as a listener (Step S102). At the same time, the server 400 performs the PTT communication control (Step S202) considering the mobile telephone 100B as a listener, thereby carrying out the PTT communication.

Here, if the mobile telephone 100B transmits, to the server 400, the request for the acquisition of the floor (Step S104) and the mobile telephone 100B receives the permission signal from the server 400 (Step S105: YES) after the acquisition of the floor is granted, the loudspeaker 105 emits the sound in different manners in accordance with the number that the numerical information 600 stored in the storage unit 114 indicates, thereby performing the notification (Step S107 to S109).

That is, in the case 1, since the numerical information 600 indicates "1", the sound is emitted in the first manner (Step S108). On the other hand, in the case 2, since the numerical information indicates "2", the sound is emitted in the second manner (Step S109).

From S110 downward, the mobile telephone 100, as described above, continues to perform the voice transmission (Step S109) until the PTT operation unit 110 is rendered off. When the PTT operation unit 110 is rendered off, the mobile telephone 100 returns to the voice reception (Step S112).

As mentioned above, in the first embodiment, since the notification is performed in different manners in accordance with whether the number of listeners is one or two or more, based on the numerical information 600 held in the storage unit 114, the user can recognize whether the communication is the one-to-one communication or the one-to-many communication before speaking as a speaker after acquiring the floor.

Second Embodiment

Hereinafter, the second embodiment which is a modification example of the first embodiment is described in the following. Note that like the first embodiment, a description is given of a case where the mobile telephone 100 performs the PTT communication as a listener at first.

Descriptions of the mobile telephone 100, the server 400, the list of members 500 and the numerical information 600 of the second embodiment are same as those of the first embodiment and therefore are omitted.

The second embodiment is different from the first embodiment in the processing operation. That is, in the first embodiment, informing control is performed, referring to the numerical information 600 received and stored in Step S101, in starting the PTT communication. However, in the second embodiment, the mobile telephone 100 performs the informing control, referring to the newest numerical information sent from the server 400, every time the mobile telephone 100 acquires the floor. Here, the processing operation having the same processes as the first embodiment is designated by the same reference as the first embodiment, and only differences in the processing operation between the mobile telephone 100 and the server 400 are described.

<1. Processing Operation of the Mobile Telephone 100>

Figure 9:
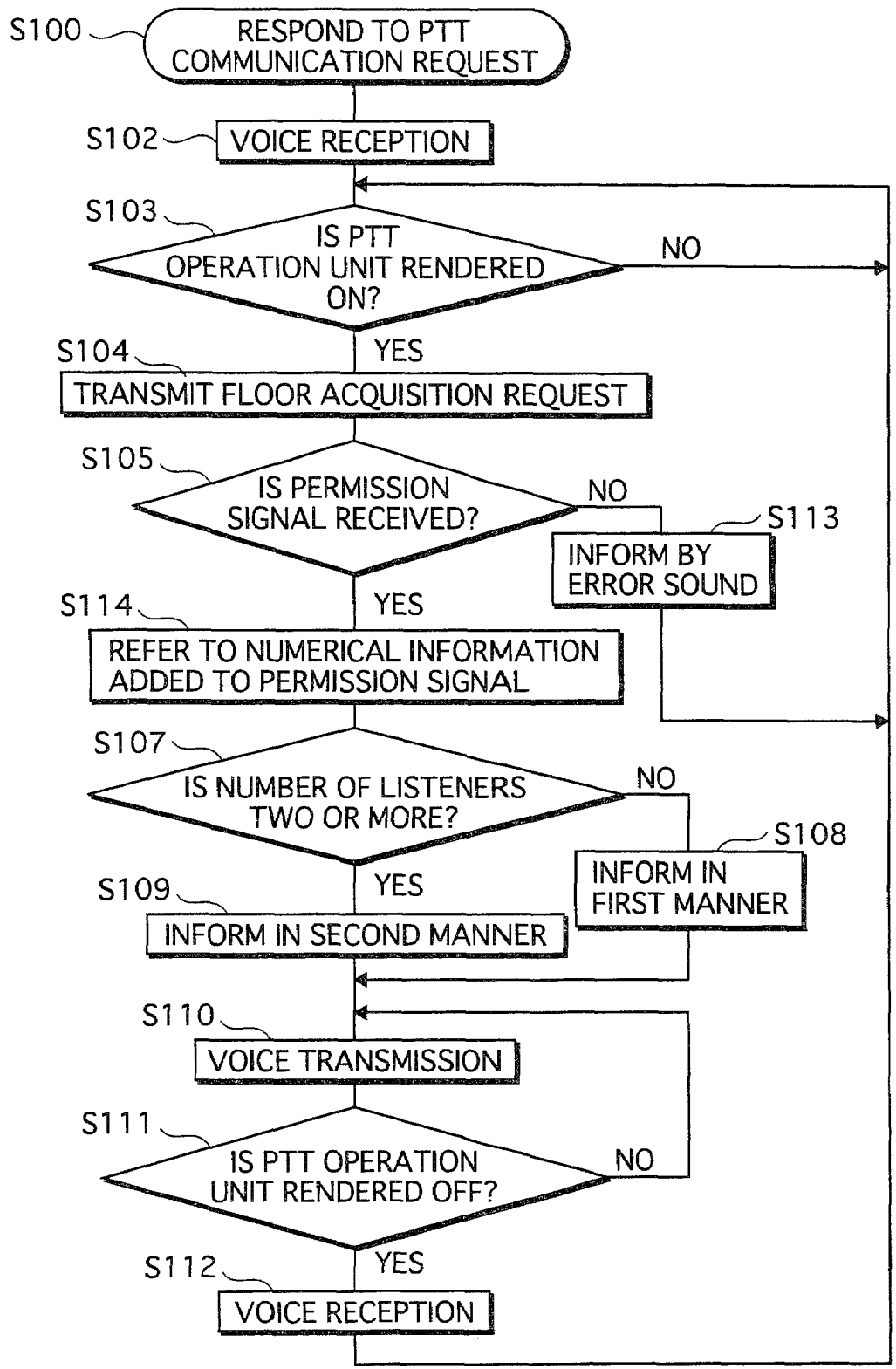
FIG. 9 is a flowchart of the second embodiment of the present invention showing the processing operation of the mobile telephone 100 in performing the PTT communication.

FIG. 9 is a flowchart of the second embodiment showing the processing operation of the mobile telephone 100 in performing the PTT communication.

Firstly, if the mobile telephone 100 responds to the PTT communication request, which is received from the mobile telephone of the other user (the initiator of the PTT communication) (Step S100), the PTT communication starts and the mobile telephone 100 performs the voice reception (Step S102).

After that, the mobile telephone 100 transmits, to the server 400, the request for the acquisition of the floor (Step S105). If the request is granted, the mobile telephone 100 receives, from the server 400, the data frame including the list of members 500 and the numerical information 600 with the permission signal (Step S105: YES).

Here, the mobile telephone 100 refers to the numerical information 600 attached to the received permission signal (Step S114). When the number of listeners is one (Step S107: NO), the mobile telephone 100 informs by emitting the sound from the loudspeaker 105 in the first manner. On the other hand, when the number of listeners is two or more (Step S107: YES), the mobile telephone 100 informs by emitting the sound from the loudspeaker 105 in the second manner (Step S109).

Subsequently, the mobile telephone 100 performs the voice transmission until the PTT operation unit 110 is rendered off. It is same as the first embodiment that the mobile telephone 100 returns to the voice reception if the PTT operation unit is rendered off (Step S110 to S112).

<2. Processing Operation of the Server 400>

The processing operation of the server 400 is described in the following.

FIG. 10 is a flowchart of the second embodiment showing the processing operation of the server 400 in performing the PTT communication.

Figure 11A:
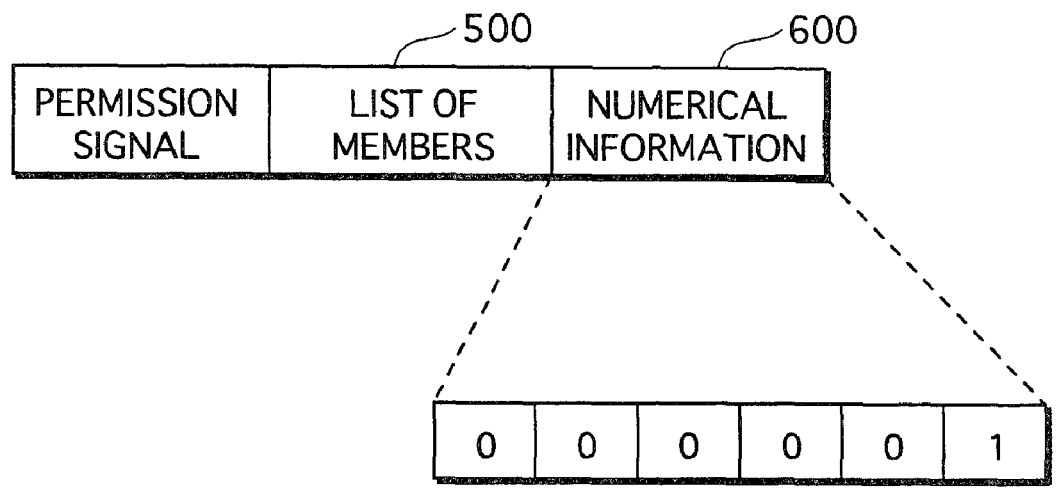
FIGS. 11A and 11B are schematic illustrations of data frames of data transmitted from the server 400 to the mobile telephone 100.
Figure 11B:
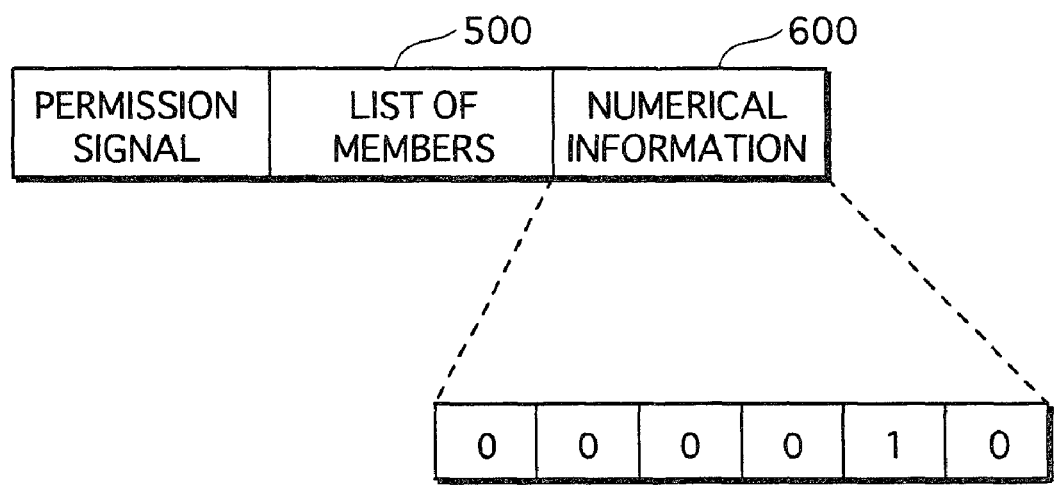

FIGS. 11A and 11B are schematic illustrations showing data frames of data to be transmitted to the mobile telephone 100 from the server 400.

Firstly, the server 400 transfers, to the mobile telephone 100, the request for the PTT communication sent from the mobile telephone of the user (the initiator of the PTT communication) (Step S200), and when the mobile telephone 100 responds to the request, the server 400 controls the PTT communication to allow the mobile telephone 100 to perform the voice reception (Step S202).

According to the present embodiment, when there is a change in the number of members (Step S210: YES) while controlling the PTT communication, the server 400 updates the list of members 500 stored in the storage unit 403 (Step S211). Note that the change in the number of listeners occurs, for example, when another new user joins the PTT communication, or when the user, on the other hand, leaves the PTT communication and the like.

After that, in the case of granting the floor acquisition request, which is received from the mobile telephone 100 (Step S204: YES), the numerical information 600 is generated based on the list of members 500 stored in the storage unit 403, and as shown in the FIGS. 11A and 11B, the data frame including the list of members 500 and the generated numerical information 600 is transmitted to the mobile telephone 100 (Step 212). Note that, FIG. 11A illustrates the data frame when the number of listeners is one, while FIG. 11B illustrates the data frame when the number of listeners is two.

From then on, the server 400 continues to control the PTT communication to allow the mobile telephone 100 to perform the voice transmission until the PTT operation unit 110 is rendered off. If the PTT operation unit is rendered off, it is same as the first embodiment that the server 400 controls the PTT communication to allow the mobile telephone 100 to perform the voice reception (Step S207 to S209).

As mentioned above, in the second embodiment, when the request for the acquisition of the floor is granted and the mobile telephone 100 becomes a speaker, the informing control is performed based on the numerical information 600 generated by the server 400. Therefore, the user can recognize whether the communication is the one to one or one-to-many communication accurately in speaking as a speaker. For example, the PTT communication was performed between two users (i.e. one-to-one communication) at the beginning. However, during the long voice-reception process, a new user joins the communication and the one-to-one communication becomes the one-to-many communication due to the increase in the number of listeners. Even in this case, the user can accurately recognize that the communication is the one-to-many communication in speaking as a speaker.

Third Embodiment

The third embodiment, which is a modification example of the first and second embodiments, is described in the following. Note that, like the first and second embodiments, a description is given of a case where the mobile telephone 100 performs the PTT communication as a listener first.

Descriptions of the mobile telephone 100, the server 400, the list of members 500 and the numerical information 600 of the third embodiment are same as those of the first and second embodiments, and therefore omitted.

The third embodiment is different from the first embodiment in the processing operation. That is, in the first and second embodiments, the informing control is performed in accordance with whether the number indicated by the numerical information 600, transmitted form the server 400, is one or plural. However, in the third embodiment, the user is informed of the increase in the number of listeners if the number of listeners increases compared to the previous speech. Note that the processing operation having the same processes as the first and second embodiments are designated by the same references, and the only differences in the processing operation between the mobile telephone 100 and the server 400 are described.

<1. Processing Operation of the Mobile Telephone 100>

FIG. 12 is a flowchart of the third embodiment showing the processing operation of the mobile telephone 100 in performing the PTT communication.

Firstly, when the mobile telephone 100 responds to the PTT communication request, which is received from the mobile telephone of the other user (the initiator of the PTT communication) (Step S100), the mobile telephone 100 receives and stores the data frame, which is transmitted from the server 400, including the list of members 500 and the numerical information 600 in the storage unit 114 (Step S101). Then, the PTT communication starts and the mobile telephone 100 performs the voice reception (Step S102).

After that, the mobile telephone 100 transmits the request for the acquisition of the floor to the server 400 (Step S105). When the request is granted, the mobile telephone 100 receives, from the server 400, the data frame including the list of members 500 and the numerical information 600 with the permission signal (Step S105: YES).

Here, the mobile telephone 100 compares the number indicated by the numerical information 600, which is included in the received data frame, with the number indicated by the numerical information 600, which is stored in the storage unit 114. If the number indicated by the received numerical information 600 is greater than the other (Step S115: YES), the notification is performed by emitting the sound from the loudspeaker 105 in the predetermined manner (Step S116).

Then the mobile telephone 100 updates the numerical information in the storage unit 114 (Step S117) by storing the numerical information 600 received in the Step S115: YES.

Hereinafter, the voice transmission continues unless the PTT operation unit 110 is rendered off. It is same as the first embodiment that the mobile telephone 100 returns to the voice reception when the PTT operation unit 110 is rendered off (Step S110 to S112).

<2. Processing Operation of the Server 400>

The processing operation of the server 400 is described in the following.

FIG. 13 is a flowchart of the third embodiment showing the processing operation of the server 400 in performing the PTT communication.

Firstly, the server 400 transfers, to the mobile telephone 100, the PTT communication request transmitted form the mobile telephone of the user (the initiator of the PTT communication) (Step S200). Then, when the mobile telephone 100 responds to the request, the data frame including the list of members 500 and the numerical information 600 is transmitted to the mobile telephone 100 (Step S201). Then the mobile telephone 100 controls the PTT communication to allow the mobile telephone 100 to perform the voice reception (Step S202).

After that, like the second embodiment, when there is a change in the number of members during the PTT communication (Step S210: YES), the list of members 500 stored in the storage unit 403 is updated (Step S211).

After that, in the case of granting the request, which is received from the mobile telephone 100, for the acquisition of the floor (Step S204: YES), the numerical information 600 is generated based on the list of members 500 stored in the storage unit 403, and as shown in the FIG. 11, data frame including the list of members 500 and the generated numerical information 600 is transmitted to the mobile telephone 100 (Step 212).

From then on, the server 400 continues to control the PTT communication to allow the mobile telephone 100 to perform the voice transmission until the PTT operation unit 110 is rendered off. If the PTT operation unit 110 is rendered off, it is same as the first embodiment that the server 400 controls the PTT communication to allow the mobile telephone 100 to perform the voice reception (Step S207 to S209).

As mentioned above, in the third embodiment, even though the number of members increases by a new user joining the PTT communication while the mobile telephone 100 is performing the voice reception as a listener, the notification is performed when the mobile telephone 100 is granted the acquisition of the floor and becomes a speaker. Thus, the user can recognize the increase in the number of listeners reliably in speaking. Also, since the numerical information 600 is updated every time the mobile telephone 100 acquires the floor, the user can accurately recognize whether the number of listeners increases or not.

<Supplemental Explanation>

Hereinbefore, the mobile telephone 100 pertaining to the present invention is described based on the first to third embodiments. However, the present invention is not limited to the configuration shown in the above embodiments and the following modifications are possible.

(1) In the first to third embodiments, although the sound is emitted from the loudspeaker 105 of the mobile telephone 100 to inform, the sound may be emitted from an external loudspeaker connected to the mobile telephone 100.

Figure 14:
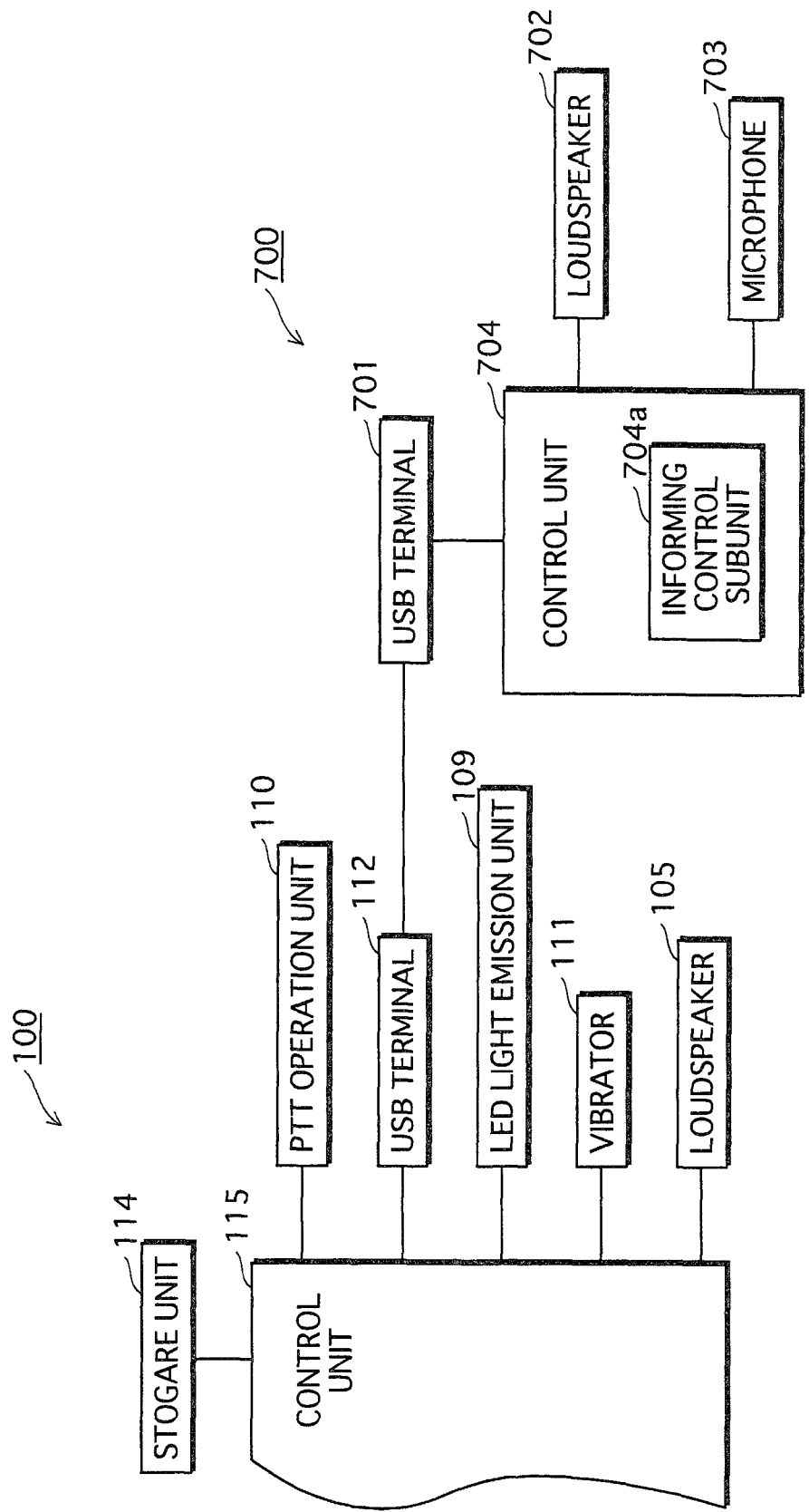
FIG. 14 is a functional block diagram of a modification example of the present invention showing an essential of the external device connected to the mobile telephone 100.
Figure 15A:
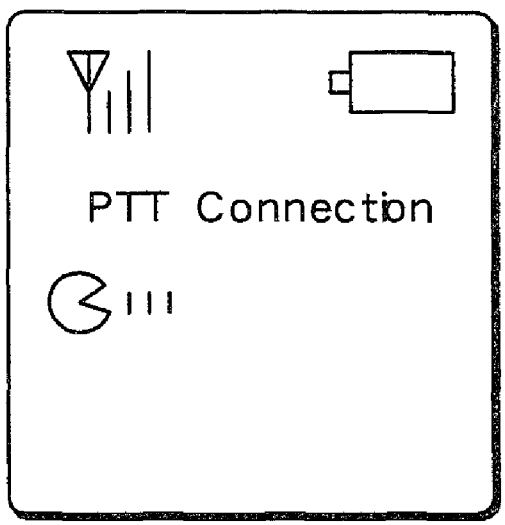
FIGS. 15A and 15B are illustrations of conventional mobile telephones showing examples of screen displays.
Figure 15B:
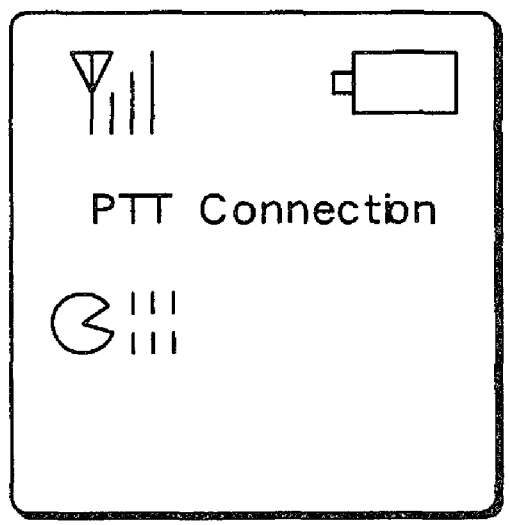

FIG. 14 illustrates an example of emitting the sound from a loudspeaker provided in an external device 700 which is connected to the mobile telephone 100.

Here, specifically, the external device 700 is a headset, a car hands free kit which is built in a car console and connectable to the mobile telephone 100 or the like that are provided as surrounding equipments of the mobile telephone 100. Also, the external device 700 includes USB terminal 701, a loudspeaker 702, a microphone 703 and a control unit 704.

The mobile telephone 100 is configured to be connected to the external device 700 via the USB terminal 112 and the informing control subunit 115B is configured to control an output signal to the external device 700. By having such configuration, the sound can be emitted from the loudspeaker 702.

Thus, in emitting the sound in Step S108 or Step S109 shown in the first and second embodiments, or in Step S116 shown in the third embodiment, the mobile telephone 100 can emit the sound from the external loudspeaker 700 without activating its own loudspeaker 105.

By having such configuration, even in a situation where the PTT communication is being performed using the loudspeaker 702 and the microphone 703, with the external device 700 connected to the mobile telephone 100, without using either the loudspeaker 105 or the microphone 107, the user can hear the emitted sound with accuracy.

(2) As modification examples of the first to third embodiments, the mobile telephone 100 may be configured to perform the informing control of step S108 and Step S109, or Step S116, only where the casing detection unit 115c of the mobile telephone 100 detects that the first casing 101 and the second casing 102 are folded onto each other.

By having such configuration, when the mobile telephone 100 is used in an open position without being folded so as to enable the user to visually observe the icons displayed on the display unit 106, power consumption can be reduced since the notification by emitting the sound from the loudspeaker 105 is not performed.

(3) As modification examples of the first and second embodiments, the notification may be performed differently in accordance with the number of listeners in Steps 108 or 109.

That is, the number of sound emission is decided in accordance with the number of listeners which has been judged in the Step S107. For example, sound is emitted once from the loudspeaker 105 if the number of listeners is one, twice if the number of listeners is two, and four times if the number of listeners is four.

By having such configuration, the user can recognize not only whether the number of listeners is one or plural, but also the specific number of listeners.

(4) As modification examples of the first to third embodiments, in Step S108, Step S109 and Step S116, the notification may be performed by vibration generated by the vibrator 111 provided with the mobile telephone 100, instead of emitting the sound from the loudspeaker 105. In this case, the manner may be the frequency of vibration, the period of vibration or the like that is recognized to be different vibrations from one another in users' sense of pressure or pain.

Also, the notification may be performed by emitting light from the LED light emission unit 109 mounted on the mobile telephone 100. In this case, the manner may be the frequency of light emission, the period of light emission or the like that is recognized to be visually different light emission patterns.

(5) In the first to third embodiments, the LED light emission unit 109 is, as shown in FIG. 2, mounted in a vicinity of the loudspeaker 105 on the first casing 101. However, the present invention is not limited to this and the LED light emission unit 109 may be mounted on the back or side of the first casing 101 so as to be observed visually even when the first casing and second casing, for example, are folded.

(6) In the first to third embodiments, the LED light emission unit 109 using LED as illuminant is shown, however, the present invention is not limited to this and a flash made using a xenon tube, for example, may be used instead.

(7) In the first to third embodiments, the USB terminal 112 based on the USB standard as an interface that connects the mobile telephone 100 to the external device is shown. However, the present invention is not limited to this and various modifications are possible.

For example, the terminal may be capable of radio connection based on Bluetooth (registered trademark) or IrDA (Infrared Data Association).

(8) In the first to third embodiments, as the mobile telephone 100, a folding mobile telephone whose first casing 101 and second casing 102 are connected by the connecting member 103 is shown. However, the present invention is not limited to this and various modifications are possible.

The mobile telephone 100, for example, may be a rotatable mobile telephone whose first casing and second casing are rotatable along an axis vertical to sides where the first casing and second casing oppose each other, a slidable mobile telephone whose first casing and second casing can slide horizontally relative to sides where the first casing and second casing oppose each other, or a bar-type mobile telephone which is composed of a single casing.

(9) In the first to third embodiments, the numerical information 600 is expressed by a string of 6 bits so that up to 64 users can be recognized. However, the present invention is not limited to this and various modifications are possible.

For example, if the numerical information is expressed by a line of eight bits, up to 256 users may be recognized. The number of bits may be appropriately decided.

(10) In the first to third embodiments, the example is given of the case where the numerical information 600 that indicates the number of communication apparatuses of users is generated by the server 400 and is transmitted to the mobile telephone 100. However, the present invention is not limited to this.

That is, the server 400 may send only the list of members 500 that indicates the situation of members participating in the PTT communication as the situation information.

In this case, the mobile telephone 100 may recognize the number of listeners by counting the number of members with no floor, referring to "floor" columns of members illustrated in FIGS. 5A and 5B.

To describe the operation specifically, in the first embodiment, the server 400 transmits only the list of members 500 in Step 201. The mobile telephone 100 stores only the list of members 500 in Step 101 and recognizes the number of listeners referring to the list of members 500 in Step S106.

In the second embodiment, the server 400 transmits the permission signal and the list of members 500 in Step S212. The mobile telephone 100 recognizes the number of listeners referring to the list of members 500 in Step S114.

In the third embodiment, the server 400 transmits only the list of members 500 in Step S201 and transmits the permission signal and the list of members 500 in Step 212. The mobile telephone 100 stores only the list of members in Step 101 and refers to the list of members 500 in the Step 114. In Step S115, the number of listeners obtained by referring to the list of members 500 in the storage unit is compared with the number of listeners obtained by referring to the received list of members. Then, the list of members 500 in storage unit is updated in Step S117.

(11) In the first to third embodiments, the example is given of the case where the informing control is performed (Steps S108 and S109), in response to the user performing the operation to request the server 400 for the floor. However, the present invention is not limited to this.

That is, the informing control may be performed, in response to the user performing some predetermined operation from the operation unit 108.

(12) In the first to third embodiments, although the PTT is described as an example of group communications, the present invention is not limited to this. The present invention is, for example, applicable to various communication modes that perform the group communication among a plurality of members, such as TV meeting using mobile telephones and the like.

(13) Note that, in the first to third embodiments, the processing operation of the mobile telephone 100 shown in FIG. 6, FIG. 9 and FIG. 12 may be written using programming language to have the mobile telephone 100 perform the processing operation. Also, the processing operation of the server 400 shown in FIG. 7, FIG. 10 and FIG. 13 may be written using the programming language to have the server 400 perform the processing operation.

INDUSTRIAL APPLICABILITY

The mobile telephone of the present invention is applicable to the wide range of mobile telephones that perform the communication by transmitting voice, which is inputted by a loudspeaker having the floor, to communication apparatuses of one or more listeners having no floor via the server. Also the present invention is useful technology that enables a speaker to recognize whether the communication is the one-to-one communication or one-to-many communication in speaking.

The invention claimed is:

1. A mobile telephone, comprising:
a communication performing unit operable to perform communication by transmitting voice, which is inputted by a speaker having a floor, via a server, to one or more communication apparatuses of one or more listeners having no floor;
a receiver operable to receive situation information, which is transmitted from the server, indicating a situation of the communication apparatuses of the listeners; and
an informing control unit operable to perform informing control to inform in different manners, other than by speech, in accordance with the number of the communication apparatuses of the listeners which is indicated by the situation information.

2. The mobile telephone of claim 1, wherein
the informing control unit performs the informing control only when a predetermined operation is performed by the speaker.

3. The mobile telephone of claim 1, further comprising:
a transmitter operable, when a predetermined operation is performed by the speaker, to transmit a request signal which makes a request for an acquisition of the floor to the server, wherein
the receiver is further operable to receive a permission signal, which is transmitted from the server, for the acquisition of the floor in response to the request signal, and
the informing control unit performs the informing control when the receiver receives the permission signal.

4. The mobile telephone of claim 1, wherein
the situation information is numerical information that indicates the number of the communication apparatuses of the listeners, and
the informing control unit performs informing control to inform in different manners in accordance with the number of the communication apparatuses of the listeners which is indicated by the numerical information.

5. The mobile telephone of claim 1, further comprising:
a loudspeaker, wherein
the informing control unit performs the informing control to inform by emitting a sound from the loudspeaker in different manners in accordance with the number of the communication apparatuses.

6. The mobile telephone of claim 1, wherein
the informing control unit performs the informing control in a first manner when the number of the communication apparatuses is one and in a second manner when the number of the communication apparatuses is two or more.

7. The mobile telephone of claim 1, further comprising:
a loudspeaker, wherein
the informing control unit performs the informing control by emitting a sound from the loudspeaker a number of times equal to the number of the communication apparatuses.

8. The mobile telephone of claim 3, further comprising:
a storage unit that stores the number of the communication apparatuses of the listeners which is indicated by the situation information, wherein
the informing control unit, in receiving the permission signal and the situation information, compares the number of the communication apparatuses of the listeners which is indicated by the received situation information with the number of the communication apparatuses of the listeners which is stored in the storage unit and performs the informing control in a predetermined manner if the number of the communication apparatuses of the listeners which is indicated by the received situation information is more than the number stored in the storage unit, and
the storage unit updates the situation information, by storing the number of the communication apparatuses of the listeners which is indicated by the received situation information after the comparison is performed by the informing control unit.

9. The mobile telephone of claim 1, further comprising:
a vibrator, wherein
the informing control unit performs the informing control to inform by vibrating in different manners using the vibrator, in accordance with the number of the communication apparatuses.

10. The mobile telephone of claim 1, further comprising:
a light emission unit, wherein
the informing control unit performs the informing control to inform by emitting light in different manners using the light emission unit, in accordance with the number of the communication apparatuses.

11. The mobile telephone of claim 1, further comprising:
two casings which are connected so as to be capable of overlapping each other via a connecting member;
a display unit mounted on a surface of at least one of the two casings, the surface being not visible from outside when the two casings overlap each other; and a casing detection unit operable to detect that the two casings overlap each other, wherein the informing control unit performs the informing control to inform in different manners in accordance with the number of the communication apparatuses, only when the casing detection unit detects that the two casings overlap each other.

12. The mobile telephone of claim 1, further comprising:

a connection unit operable to connect to an external device capable of receiving output signal from the mobile telephone; and a connection detecting unit operable to detect the connection with the external device via the connection unit, wherein the informing control unit controls the output signal to the external device only when the connection detecting unit detects the connection with the external device, thereby performing the informing control via the external device.

13. An informing method used for a mobile telephone for performing communication by transmitting voice, which is inputted by a speaker having a floor, via a server, to one or more communication apparatuses of one or more listeners having no floor, the informing method comprising:

a situation information receiving step of receiving situation information, which is transmitted from the server, indicating information of the communication apparatuses of the listeners, and an informing control step of performing different informing controls, other than by speech, in accordance with the number of the communication apparatuses of the listeners which is indicated by the situation information.

14. A non-transitory computer-readable medium storing thereon a program causing a mobile telephone that performs communication by transmitting voice, which is inputted by a speaker having a floor, via a server, to one or more communication apparatuses of one or more listeners having no floor, to execute an informing control process, wherein the informing control process includes:

a situation information receiving step of receiving situation information, which is transmitted from a server, indicating situation of the communication apparatuses of the listeners; and an informing control step of performing different informing controls, other than by speech, in accordance with the number of the communication apparatuses of the listeners which is indicated by the situation information.

* * * * *